United States Patent [19]

Hoashi et al.

[11] Patent Number: 4,714,748

[45] Date of Patent: Dec. 22, 1987

[54] NOVEL POLYTETRAFLUOROETHYLENE FINE POWDER

[75] Inventors: Jyuzaemon Hoashi, Ibaraki; Syozo Fumoto, Suita; Kiyoshi Oshita, Sakai, all of Japan

[73] Assignee: Daikin Kogyo Co., Ltd., Osaka, Japan

[21] Appl. No.: 858,836

[22] Filed: Apr. 29, 1986

Related U.S. Application Data

[63] Continuation of Ser. No. 721,508, Apr. 11, 1985, abandoned, which is a continuation of Ser. No. 561,048, Dec. 13, 1983, abandoned.

[30] Foreign Application Priority Data

Dec. 14, 1982 [JP] Japan ............................. 57-219569

[51] Int. Cl.$^4$ ............................................. C08F 14/26
[52] U.S. Cl. ........................................ 526/255; 524/546
[58] Field of Search ............... 526/209, 206, 214, 255; 524/546

[56] References Cited

U.S. PATENT DOCUMENTS

| | | | |
|---|---|---|---|
| Re. 31,341 | 8/1983 | Koizumi et al. | 526/255 |
| 2,874,152 | 2/1959 | Bolstad et al. | 526/214 |
| 3,006,881 | 10/1961 | Bolstad et al. | 526/214 |
| 3,088,941 | 5/1963 | Uhland | 526/214 |
| 3,535,301 | 10/1970 | Groppelli et al. | 524/546 |
| 3,953,412 | 4/1976 | Saito et al. | 526/255 |
| 4,078,134 | 3/1978 | Kuhls et al. | 526/209 |
| 4,363,900 | 12/1982 | Shimzu et al. | 526/255 |

Primary Examiner—Paul R. Michl
Assistant Examiner—Alex H. Walker
Attorney, Agent, or Firm—Birch, Stewart, Kolasch & Birch

[57] ABSTRACT

Polytetrafluoroethylne fine powder is disclosed having an average molecular weight of at least 6,000,000, an amorphous index larger than 0.1 and a number average primary particle size of 0.1 to 0.8 micron, and further having a clear endothermic peak at a temperature of 347°±3° C. and another endothermic peak or shoulder at a temperature between 330° C. and the temperature of said clear endothermic peak on a crystalline melting chart recorded by a differential scanning calorimeter. An unsintered article is made which is sintered and expanded at a temperature higher than the melting point of the polytetrafluoroethylene to give a porous article having improved properties.

8 Claims, 9 Drawing Figures

344
Temperature (°C)

FIG. 5

345
Temperature (°C)

NOVEL POLYTETRAFLUOROETHYLENE FINE POWDER

This application is a continuation of application Ser. No. 721,508 filed on Apr. 11, 1985, now abandoned, which is a continuation of application Ser. No. 561,048 filed on Dec. 13, 1983, now abandoned.

FIELD OF THE INVENTION

The present invention relates to novel polytetrafluoroethylene (hereinafter referred to as "PTFE") fine powder. More particularly, it relates to PTFE fine powder, an unsintered article made of the PTFE which is sintered and expanded at a high temperature to give a porous PTFE material having improved properties.

BACKGROUND OF THE INVENTION

A porous material made of PTFE fine powder is a noteworthy new material, and some processes for preparing the same have been proposed. Fundamentally, the processes comprise extruding or calendering the PTFE fine powder to form a string, a tube or a film and expanding the formed article before or after sintering.

The conventional processes are roughly classified into the following two groups:

1. Processes comprising expanding the PTFE article at a temperature lower than the melting point of sintered PTFE, namely 327° C. and then sintering the expanded article at a temperature higher than the melting point, and 2. Processes comprising expanding the PTFE article at a temperature higher than the melting point of PTFE, preferably higher than the melting point of unsintered PTFE, namely about 345° C. which varies with the kinds of the PTFE fine powder and polymerization procedures in emulsion polymerization.

In the latter processes, sintering and expansion of the PTFE article are carried out simultaneously. This reduces the production steps and improves the properties of the porous PTFE material, while the article it tends to easily break since it is expanded at a temperature higher than the melting point of PTFE.

SUMMARY OF THE INVENTION

The present invention provides PTFE fine powder which is preferably expanded at a high temperature. The PTFE fine powder of the invention has an average molecular weight of at least 6,000,000, preferably at least 6,500,000, an amorphous index larger than 0.1 and a number average primary particle size of 0.1 to 0.8 microns and further has a clear endothermic peak at a temperature of 347±3° C. and an another endothermic peak or shoulder at a temperature between 330° C. and the temperature of the clear endothermic peak on a crystalline melting chart recorded by a differential scanning calorimeter (hereinafter referred to as "DSC"). The PTFE fine powder of the invention is further characterized in that the endothermic ratio in the crystalline melting chart as defined below is larger than 0.30.

The present invention further provides a process for preparing the PTFE fine powder of the invention which comprises emulsion polymerizing tetrafluoroethylene (hereinafter referred to as "TFE") in an aqueous medium in the presence of an anionic surfactant, an emulsion stabilizer which is liquid under the polymerization conditions and a water-soluble polymerization initiator, at a temperature of lower than 20° C., preferably lower than 15° C. under a pressure of 5 to 20 Kg/cm²G.

DETAILED DESCRIPTION OF THE INVENTION

The PTFE fine powder of the invention is prepared by emulsion polymerizing TFE according to per se conventional procedures in an aqueous medium in the presence of an anionic surfactant, an emulsion stabilizer which is liquid under the polymerization conditions and a water-soluble polymerization initiator, at a temperature of lower than 20° C., preferably lower than 15° C. under a pressure of 5 to 20 Kg/cm²G.

Specific examples of the anionic surfactant are water-soluble fluorine-containing surfactants, for example, of the formulas:

wherein X is hydrogen, chlorine or fluorine, and n is an integer of 6 to 12, wherein n is an integer of 2 to 6, and wherein X is fluorine or perfluoro(lower)alkyl, m is an integer of 1 to 5, and n is an integer of 0 to 10, and salts thereof. The amount of the surfactant to be added is 0.05 to 5 % by weight on the basis of the weight of the aqueous medium.

Preferred emulsion stabilizers are hydrocarbons and halogenated hydrocarbons which are substantially inactive and liquid under the polymerization conditions. Specific examples thereof are trichlorotrifluoroethylene, dichlorotetrafluoroethane, tetrachlorodifluoroethane, octafluorocyclobutane, etc.

As the polymerization initiator, a water-soluble redox type initiator is preferably used in a minimum required amount for the initiation of the polymerization. For this end, the following kinds and amounts of the initiators and following procedures are preferred:

Specific example of the redox type initiator is a mixture of (a) water-soluble persulfates (eg. ammonium persulfate, potassium persulfate, etc.), water-soluble dibasic aliphatic corboxylic acid peroxides (eg. disuccinic acid peroxide, diglutaric acid peroxide, etc.) or their mixture; (b) acidic sodium sulfite and sodium sulfite or their mixture; and (c) ferrous sulfate, silver nitrate or their mixture. These components are added at the initial stage of the polymerization in amounts of (a) 0.0001 to 0.001% by weight, (b) 0.0001 to 0.001% by weight and (c) 0.01 to 0.5 ppm on the basis of the aqueous medium respectively. When the initiator mixture is added only one time, it is very difficult to initiate the polymerization since the reaction is carried out at a comparatively low temperature and usually the reactor is so contaminated that the initiator is inactivated. In the process of the invention, if the polymerization is not initiated within one hour from the initial addition of the initiator, the second portion of each component of the initiator mixture is added in an amount smaller than the initial amount. If the polymerization is not initiated within another one hour, the third portion of each component is added in an amount smaller than the second amount. If the polymerization is not initiated, such procedure is repeated at most five times. In the specification, "the polymerization being not initiated within one hour" means the case in which the interior pressure of the reactor is reduced by less than 0.2 Kg/cm$^2$ after one hour from the addition of the initiator. Such additioning manner of the initiator is also one of the characteristics of the process of the invention.

After the polymerization, the polymer is recovered by a per se conventional method such as coagulation.

The thus prepared PTFE fine powder of the invention is characterized in that it has an average molecular weight of at least 6,000,000, preferably at least 6,500,000, an amorphous index larger than 0.1 and a number average primary particle size of 0.1 to 0.8 micron, and further has a clear endothermic peak at a temperature of 347±3° C. and an endothermic peak or shoulder at a temperature between 330° C. and the temperature at which the clear endothermic peak is present on a crystalline melting chart recorded by DSC.

An article made of the PTFE fine powder of the invention has an excellent expansion property at a high temperature and rolling properry so that it is expanded in a larger draw ratio and it is suitable ior preparing a porous PTFE film or sheet.

The reason why the PTFE fine powder of the invention has a good rolling property may be explained by making reference to the particularly thin critical thickness of devitrification. The critical thickness is a criterion of the rolling property of the PTFE fine powder and measured as follows:

100 Parts by weight of PTFE fine powder containing 25 parts of an extruding assistant ("Smoil P-55") is extruded through a mold having a cylinder with an inner diameter of 40 mm and a die with an inner diameter of 5 mm to form a strand and rolled in one step with a pair of rolls with a predetermined nip between them. Then, each new strand is rolled with each pair of rolls having a successively narrowed nip. At a certain nip of the rolls, the strand cannot be formed in a film. Before that stage, with a certain specific thickness of the rolled film, its transparency disappears. Such thickness is defined as the critical thickness of devitrification. The critical thickness of devitrification of a certain specific PTFE fine powder varies with processing conditions and thus it is not an absolute value. However, once the processing conditions are kept constant, the same result is obtained. Therefore, it is useful criterion for evaluating the rolling property of the PTFE fine powder.

The processing conditions which affect the critical thickness of devitrification are, for example, the kind of the extrusion assistant to be used, reduction ratio of the mold and the diameter and the circumferential speed of the roll. The critical thickness of devitrification of the PTFE fine powder of the invention and of some kinds of commercially available PTFE fine powder is measured under the conditions as described above at a temperature of about 20° to 25° C. at a periphery roll speed of 23.6 m/min. The results are shown in Table 1.

TABLE 1

| PTFE fine powder | Critical thickness of devitrification (microns) |
|---|---|
| Fine powder of the invention | 20-25 |
| Polyflon F 103[*1] | 110 |
| Teflon 6J[*2] | 100 |
| Fluon CD-1[*3] | 90 |
| Fluon CD-4[*3] | 90 |
| Hostaflon TF-22[*4] | 55 |

Note
[1]Manufactured by Daikin Kogyo Co., Ltd.
[2]Manufactured by Mitsui Fluorochemical Co., Ltd.
[3]Manufactured by ICI Ltd.
[4]Manufactured by Hoechst A.G.

Figure 1:
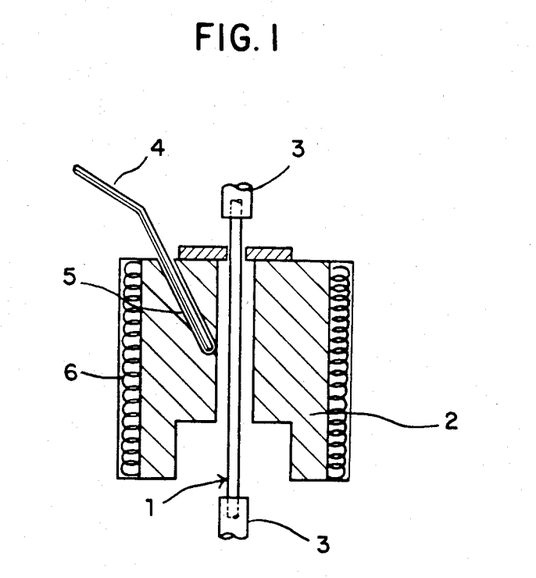
FIG. 1 is a cross-sectional view of an apparatus for measuring the strength at break at 350° C. of the paste extruded article of the PTFE fine powder.

Further characteristics of the PTFE fine powder of the invention is that the article made thereof has excellent strength and elongation, particularly strength at a temperature higher than the melting point of the article. The strength of the article at a temperature higher than the melting point may be measured as follows:

Referring to FIG. 1, a strand 1 (15 cm) of the PTFE fine powder formed in the above described manner is attached to chucks through an oven 2, which is mounted in a universal tensile machine. In FIG. 1, numerals 4, 5 and 6 designate a thermometer, Rose alloy in which the thermometer is inserted and a heater respectively. The distance between the chucks 3 and 3' is 10 cm, and end parts of the strand are placed outside of the oven. Thus, only a central part of the strand is heated in the oven at a high temperature. The temperature of the oven is kept at 350° C. for seven minutes and the tensile test is carried out at a pulling rate of 100 mm/min. As the strand is pulled, a part of the strand is pulled out of the oven and cooled and its strength is increased so that the cooled part is hardly expanded, and only the part remained in the oven is expanded. Therefore, the tensile strength of the strand is measured by this method, but the accurate elongation is not. The thus measured strength of the strands of the PTFE fine powder are described in Examples below.

The average molecular weight (Mn) of the PTFE is determined by firstly measuring the specific gravity (hereinafter referred to as "S.G.") and converting S.G. into Mn according to the following equation:

$$\log_{10} Mn = 28.04 - 9.790 \times (S.G.)$$

According to the above equation, an average molecular weight of 6,000,000 corresponds to S.G. of 2.172. In other words, the number average of 6,000,000 or more means S.G. of 2.172 or less.

S.G. of the PTFE fine powder is measured as follows:

In an atmosphere kept at 23° to 25° C., 5 g of the PTFE fine powder is pressed in a cylindrical mold having a diameter of 32 cm under a pressure of 200 Kg/cm$^2$ and removed. The pressed PTFE sample is sintered in an oven kept at 380° C. for 30 minutes and cooled to 300° C. at a cooling rate of 70° C./hr. The sample is removed from the oven and allowed to cool at a room temperature. S.G. is a ratio of the weight of the cooled sample weighed in the air to the weight of water of the same volume.

Figure 9:
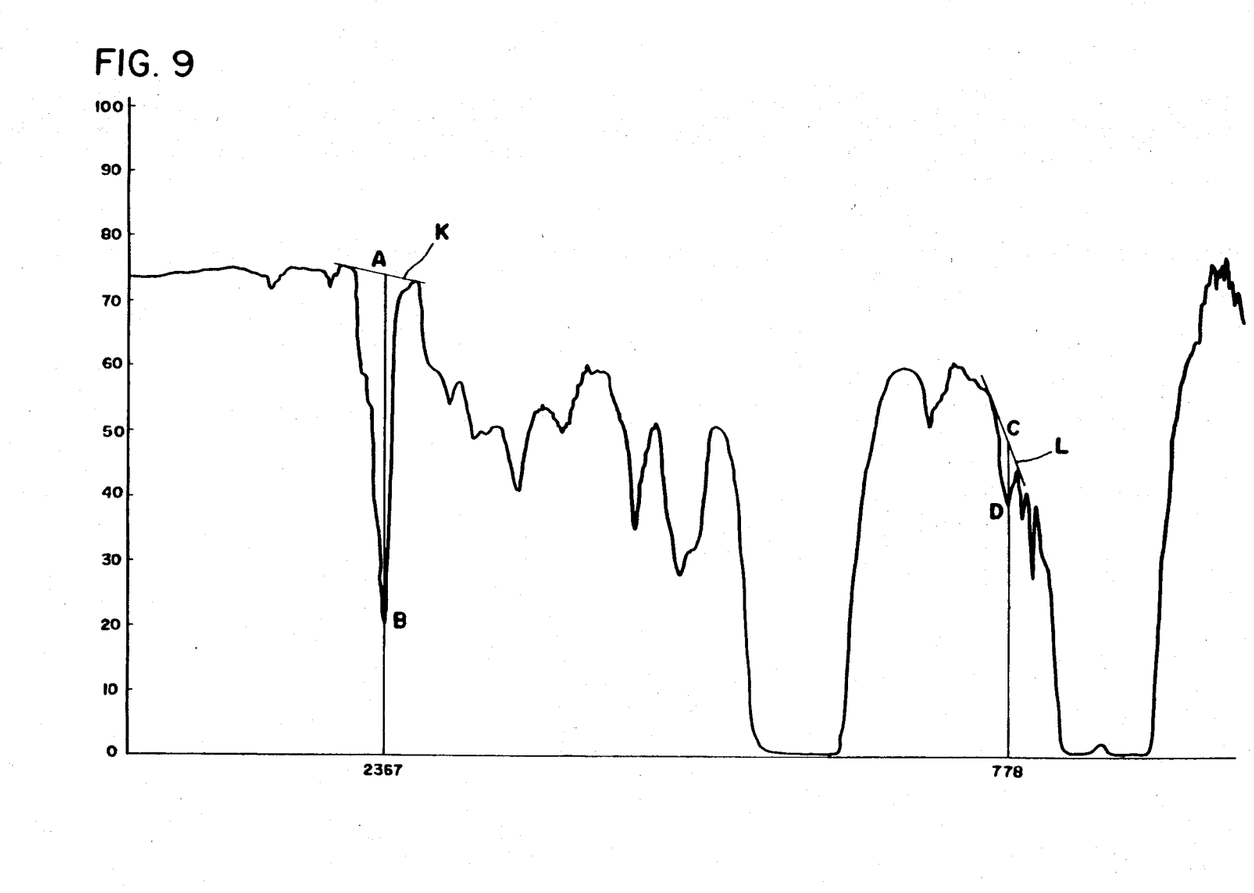
FIG. 9 is an infrared absorption spectrum from which the amorphous index is calculated.

The amorphous index (hereinafter referred to as "A.I.") is determined as a ratio of the absorbance at 778 cm$^{-1}$ to that at 2367 cm$^1$ in an infrared absorption spectrum. The procedure for calculating A.I. will be explained in detail with reference to FIG. 9, which is the infrared absorption spectrum for the PTFE fine powder obtained in Example 1 described below. In order to calculate A.I. from the spectrum, a vertical line is drawn from the maximum absorbance peak (B) at 2367 cm$^1$ to the base line (K) which has been drawn between the minimum peaks between 2800 cm$^{-1}$ and 2050 cm$^1$. The intersection of the vertical line and the base line (K) is denoted by "A". On the other hand, a vertical line is drawn from the maximum absorbance peak (D) at 778 cm$^{-1}$ to the base line (L) which has been drawn between the minimum peaks between 815 cm$^1$ and 755 cm$^{-1}$. The intersection of the vertical line and the base line (L) is denoted by "C". Then, the absorbances on the points A, B, C and D are read, and A.I. is calculated according to the following equation:

$$A.I. = \frac{\log(C/D)}{\log(A/B)}$$

Figure 2:
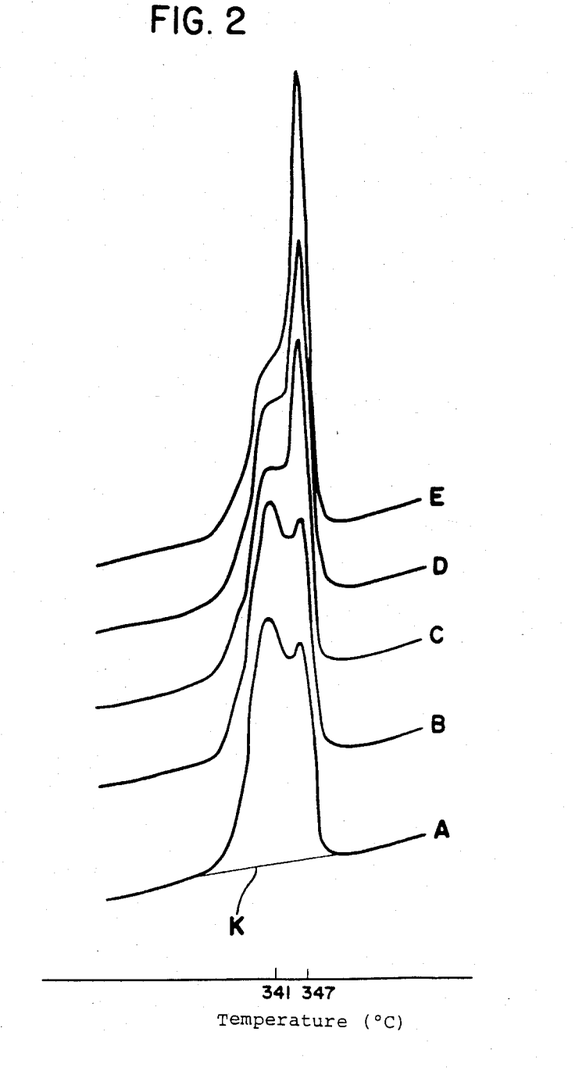
FIG. 2 shows the high temperature parts of the crystalline melting charts of the PTFE fine powder of Examples 1 to 5.
Figure 3:
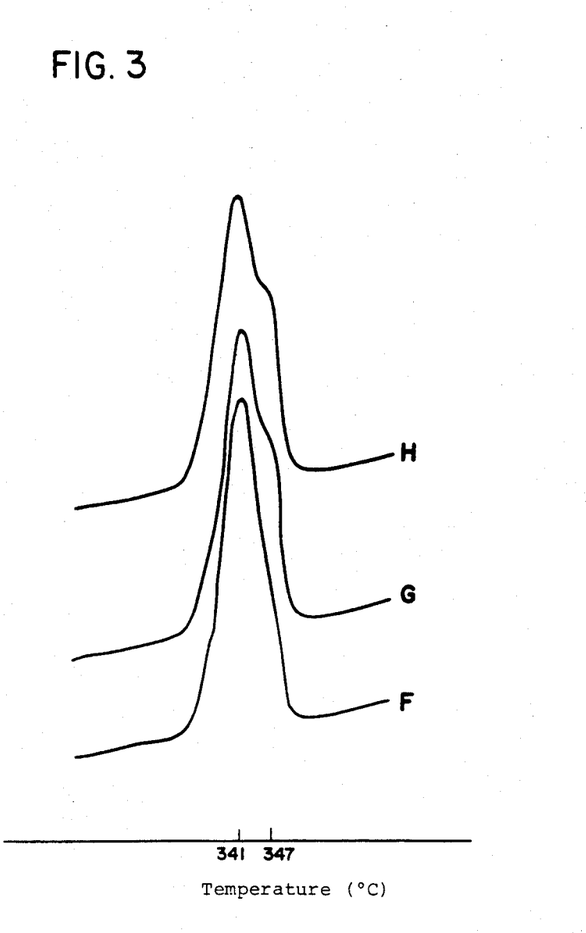
FIGS. 3 to 6 show the high temperature parts of the crystalline melting charts of the PTFE fine powder of Comparative Examples 1 to 6.
Figure 4:
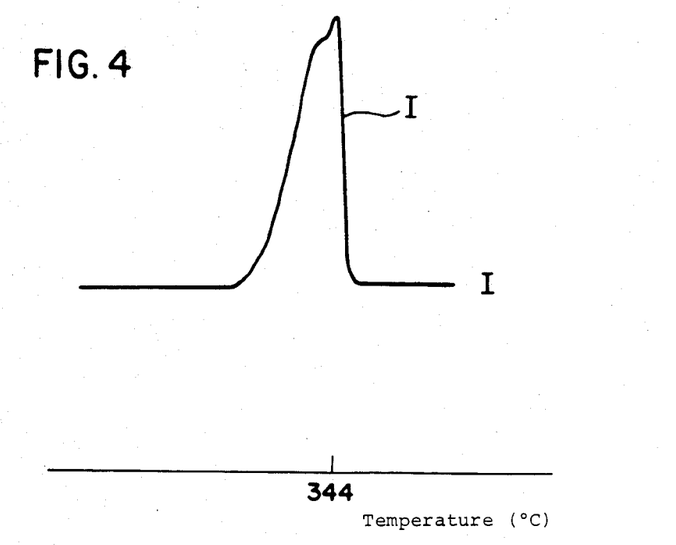
Figure 5:
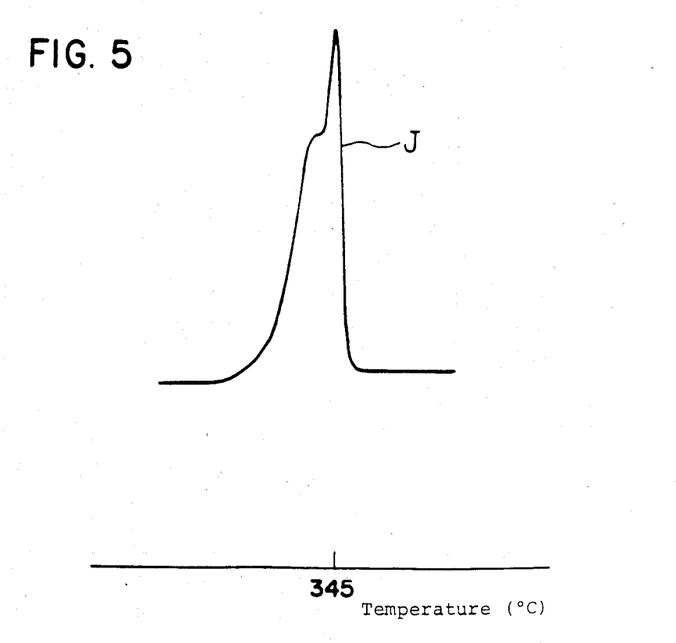
Figure 6:
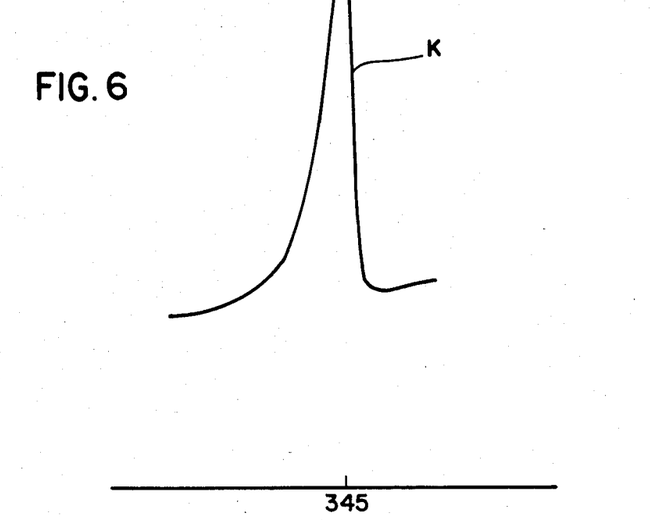

The crystalline melting chart is recorded as follows:
10 g of the unsintered PTFE fine powder is precisely weighed out and charged in an aluminum made pan. Then, its melting chart is recorded by means of a highly sensitive DSC (eg. DSC-II of Perkin-Elmer). A heating rate should be precisely adjusted at a rate of 20° C./min from a temperature lower by at least 30 degrees than the temperature at which the endothermic peak appears because, as is well known, the temperature at which the endothermic peak appears and the shape of the peak of the PTFE crystalline are influenced by the heating rate during the measurement (cf. Appl. Polymer Symposis, No. 2, 101–109 (1966)). Examples of the thus recorded charts are shown in FIG. 2, which includes the DSC endothermic patterns A to E of the PTFE fine powder of Examples 1 to 5 respectively. As is understood from the patterns, the PTFE fine powder of the invention has a clear endothermic peak at 347±3° C. and the other peak at a lower temperature, which may be a shoulder and/or have height higher than the clear endothermic peak. In either case, the PTFE fine powder of the invention is characterized in that it shows the other peak at a temperature lower than the temperature at which the clear endothermic peak appears in the crystalline melting chart. FIGS. 3, 4, 5 and 6 are the crystalline melting charts of the PTFE fine powder of Comparative Examples 1 to 6. In contrast to FIG. 2, these charts do not include any other peak or shoulder at a lower temperature.

The endothermic ratio herein used is a ratio of the height of the clear endothermic peak at 347±3° C. to that of the other peak at a lower temperature. When the lower peak is a shoulder, its height is measured at a temperature lower by 6 degrees than the temperature at which the clear endothermic peak appears. In any case, the height of the peak is measured from a base line which is drawn on the chart as shown in FIG. 2 as the line K.

The present invention will be explained further in detail by following Examples.

EXAMPLES 1 to 5

In a glass-lined reactor (381 liters) equipped with an agitator and an outer jacket through which a heat transfer medium was circulated, deionized and deoxygenated water (18 liters) and ammonium omega-hydroperfluoroheptanate [H(CF$_2$CF$_2$)$_3$COONH$_4$] (190 g) were charged and then pH of the mixture was adjusted to 8.4 by gradually adding 10% aqueous solution of sodium hydroxide. The mixture was kept at a predetermined temperature, and the upper interior of the reactor was replaced with nitrogen gas several times while agitating the mixture at 120 rpm. Thereafter, trichlorotrifluoroethane (1.85 liters) was charged and the upper interior of the reactor was replaced with gaseous TFE twice. TFE was flashed to an interior pressure of 12 Kg/cm$^2$G and then an initiator mixture was charged. As the initiator mixture, a mixture of predetermined amounts of potassium persulfate (K$_2$S$_2$O$_8$), sodium sulfite (Na$_2$SO$_3$.7H$_2$O) and silver nitrate was used. Since the amount of the initiator mixture would influence the molecular weight of obtained PTFE, minimum required amount was used. For this end, the initiator mixture was added as follows:

Firstly, 60 mg of potassium persulfate, 50 mg of sodium sulfite and 1.0 mg of silver nitrate were added and the reaction mixture was agitated at a predetermined temperature. When the polymerization initiated, the pressure of the reactor interior decreased. Then, the polymerization was continued. If the polymerization were not initiated, 35 mg of potassium persulfate, 26 mg of sodium sulfite and 0.7 mg of silver nitrate were added again, and the agitation of the mixture was continued for one hour. At this stage, if the polymerization were not initiated, 23 mg of potassium persulfate, 19 mg of sodium sulfite and 0.45 mg of silver nitrate were further added. Thereafter, if the polymerization were not initiated within one hour from the previous addition of the initiator mixture, the initiator mixture was added in the same amount as the third time.

When the polymerization was initiated, the agitation of the reaction mixture was continued for a predetermined period of time at a predetermined temperature. When the pressure of the reactor decreased to 11 Kg/cm$^2$G as the polymerization proceeded, TFE was pressurized to 12 Kg/cm$^2$G repeatedly. After the polymerization was completed, unreacted TFE was purged and the obtained PTFE dispersion was coagulated, washed and dried by a per se conventional method. The reaction conditions and the properties of the dispersion were shown in Table 2, and the properties of the obtained PTFE fine powder were shown in Table 3.

In Table 2, the average reaction rate was a value obtained by dividing the yielded amount (g) of the PTFE fine powder by the product of the reaction time (hours) and the volume (liters) of water used. As is understood from the results, the reaction rate of the process of the invention is extremely slower than in the conventional emulsion polymerization of TFE. The particle size was measured by means of an electron microscope.

In Table 3, measurement of the extrusion pressure and the preparation of the raw film were carried out as follows:

75 g of the PTFE fine powder and 23 g of a hydrocarbon lubricant ("Deobase" manufactured by L. Sonneborn Sons Inc.) were shaked together for three minutes and aged at a room temperature (25° C.) for one hour. The mixture was charged in a mold having an inner diameter of 30 mm and heated at 60° C. for ten minutes. Then, it was pressed under 100 Kg/cm$^2$ with a ram and the same pressure was kept for one minute.

After the pressure was released, it was kept at the same temperature for ten minutes.

Thereafter, the mixture was charged in a cylinder and extruded with a ram through a die having an outlet inner diameter of 5 mm at a rate of 17 mm/min. The pressure to be applied to the ram is the extrusion pressure.

The thus formed rod was rolled, and the lubricant was removed by extraction with trichloroehtylene at a room temperature (25° C.) and drying to obtain an unsintered PTFE film having a thickness of 0.1 mm.

Comparative Example 2

0.18 g of potassium persulfate, 0.09 g of sodium sulfite and 0.0036 g of silver nitrate were added.

Comparative Example 3

450 mg of potassium persulfate, 350 mg of sodium sulfite and 7.5 mg of silver nitrate were added.

The properties of the PTFE fine powder are shown in Table 5. The crystalline melting charts of the PTFE fine powder of Comparative Examples 1 to 6 are shown in FIGS. 3 to 6.

TABLE 4

| Comparative Example No. | Addition of initiator (Times) | Temp. (°C.) | Time (hrs) | Average polymerization rate (g/l/hr) | Concentration of dispersion (%) | Yield (Kg) | Average particle size (micron) |
| --- | --- | --- | --- | --- | --- | --- | --- |
| 1 | 2 | 30 | 80.0 | 3.54 | 22.4 | 5.1 | 0.500 |
| 2 | 1 | 30 | 85.5 | 3.51 | 23.8 | 5.4 | 0.550 |
| 3 | 1 | 15-17 | 90.4 | 3.38 | 24.3 | 5.5 | 0.420 |

TABLE 5

| Comparative Example No. | Mn (× 10⁴) | A.I. | DSC analysis | | | Chart in FIGS. | Extrusion pressure (Kg) | Raw film | | Tensile*² Strength (Kg/cm²) |
| --- | --- | --- | --- | --- | --- | --- | --- | --- | --- | --- |
| | | | Tm1 (°C.) | Tm2 (°C.) | Endothermic ratio | | | Strength (Kg/cm²) | Elongation (%) | |
| 1 | 443 | 0.163 | 339.5 | —*¹ | — | F | 137 | 30 | 168 | 46 |
| 2 | 486 | 0.171 | 339.5 | 345*¹ | 1.59 | G | 135 | 33 | 161 | 46 |
| 3 | 532 | 0.172 | 339 | 345.5*¹ | 1.54 | H | 149 | 34 | 204 | 53 |
| 4 | 336 | 0.085 | Shoulder | 344 | 0.82 | I | 135 | 33 | 160 | 35 |
| 5 | 432 | 0.085 | Shoulder | 345 | 0.67 | J | 138 | 35 | 173 | 39 |
| 6 | 717 | 0.088 | No Shoulder | 347 | 0.34 | K | 156 | 45 | 190 | 64 |

Note:
*¹Temperature at which the shoulder is present.
*²Measured at 350° C.

TABLE 2

| Example No. | Addition of initiator (Times) | Temp. (°C.) | Time (hrs) | Average polymerization rate (g/l/hr) | Concentration of dispersion (%) | Yield (Kg) | Average particle size (micron) |
| --- | --- | --- | --- | --- | --- | --- | --- |
| 1 | 4 | 15.8-17.3 | 125.5 | 2.29 | 22.3 | 5.17 | 0.540 |
| 2 | 4 | 15.1-16.7 | 93.8 | 3.07 | 22.4 | 5.19 | 0.490 |
| 3 | 4 | 14.5-15.3 | 95.4 | 3.22 | 23.5 | 5.53 | 0.535 |
| 4 | 3 | 13-15 | 94.3 | 3.24 | 23.4 | 5.5 | 0.520 |
| 5 | 4 | 13-14 | 100.2 | 2.83 | 22.0 | 5.1 | 0.560 |

TABLE 3

| Example No. | Mn (× 10⁴) | A.I. | DSC analysis | | | Chart in FIG. 2 | Extrusion pressure (Kg) | Raw film | | Tensile*² Strength (Kg/cm²) |
| --- | --- | --- | --- | --- | --- | --- | --- | --- | --- | --- |
| | | | Tm1 (°C.) | Tm2 (°C.) | Endothermic ratio | | | Strength (Kg/cm²) | Elongation (%) | |
| 1 | 640 | 0.160 | 339.5 | 346 | 1.14 | A | 145 | 39 | 121 | 60 |
| 2 | 701 | 0.174 | 339.5 | 346 | 1.08 | B | 167 | 42 | 214 | 63 |
| 3 | 751 | 0.178 | 340.0 | 346.5 | 0.64 | C | 182 | 57 | 164 | 65 |
| 4 | 786 | 0.198 | 340.5*¹ | 347.0 | 0.57 | D | 203 | 60 | 258 | 67 |
| 5 | 823 | 0.201 | 339.5*¹ | 346.5 | 0.38 | E | 235 | 75 | 276 | 76 |

Note:
*¹Temperature at which the shoulder is present.
*²Measured at 350° C.

COMPARATIVE EXAMPLES 1 to 6

In the same manner as in Example 1 but carrying out the reaction under the conditions as shown in Table 4, the PTFE fine powder was prepared. In Comparative Examples 4, 5 and 6, commercially available PTFE fine powders were used.

In Table 4, the amounts of the components of the initiator and the procedures for adding it are as follows:

Comparative Example 1

The same initiator mixtures in the same amounts as in Example 1 were added in the first and second addition.

Now, a typical process for preparing a porous material from the PTFE fine powder of the invention at a high temperature will be described.

The first step of the process comprises mixing the PTFE fine powder and a liquid lubricant homogeneously and extruding and/or rolling the mixture to form an article in the desired form of a rod, a tube or a film which corresponds to the shape of the porous material to be obtained. The first step may further comprise other molding step such as pressing. The liquid lubricant to be used in this step may be one that can wet the surface of the PTFE fine powder and be removed by extraction or drying after molding. Specific examples of the lubricant are hydrocarbon oils (eg. liquid paraffin, naphtha, white oil, etc.), aromatic hydrocarbons (eg. toluene, xylene, etc.), alcohols, ketones, esters, silicone oils, fluorocarbon oils, a solution of a polymer (eg. polyisobutrene, polyisoprene, etc.) in one or more of the above lubricants, a mixture of two or more of the above lubricants, an aqueous solution or mixture of a surfactant.

The amount of the lubricant to be mixed with the PTFE fine powder varies with the molding method and the presence of other additives and is usually from about 5 to 50 parts by weight, preferably from 10 to 40 parts by weight per 100 parts by weight of the PTFE fine powder.

To the PTFE fine powder, any other additive which is conventionally used may be added together with the lubricant. Specific examples of the additives are pigments and a filler which improves the strength against press, abrasion resistance and cold flow (eg. carbon black, graphite, silica powder, asbestos powder, glass powder, metal powder, metal oxide powder, metal sulfate powder, etc.).

The second step comprises removing the lubricant from the molded article by heat-drying and/or extraction to obtain the unsintered article. The heat-drying may be effected at a temperature of about 80° to 250° C. Extraction of the lubricant may be effected with chlorinate hydrocarbon.

Before or after the second step, the article may be rolled or expanded at least one more time to adjust the width, thickness, porosity and strength.

The third step comprises heating to sinter the unsintered PTFE article at a temperature higher than the melting point of the PTFE, namely about 327° C. with expanding it at least monoaxially, preferably sintering the unsintered PTFE article for a short time and then heating to sinter and expanding it at a temperature of about 340° to 410° C. for 0.1 to 5 minutes in order to avoid the denaturation of the PTFE. The heating, sintering and expansion of the article may be carried out in one or more steps.

Figure 7:
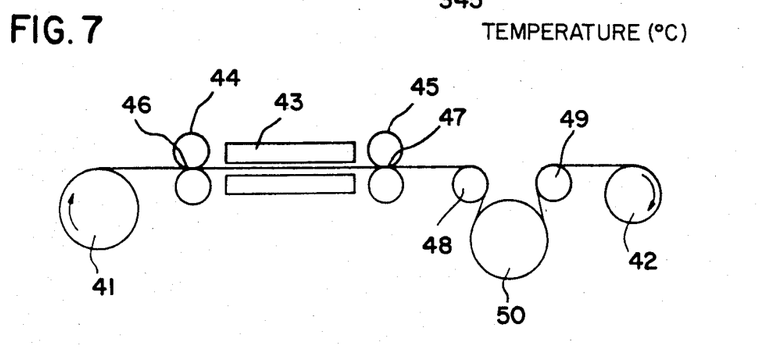
FIGS. 7 and 8 are schematic views of apparatuses for heating, sintering and expanding the unsintered PTFE article.
Figure 8:
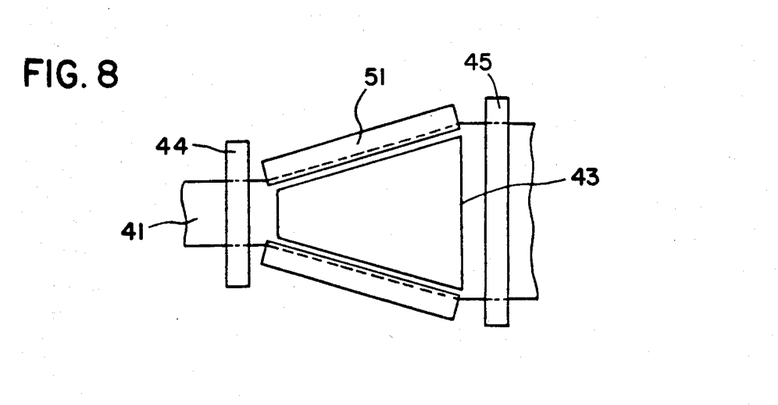

The heating, sintering and expansion of the unsintered PTFE article are important steps and may be carried out by the use of apparatuses as shown in FIGS. 7 and 8. By the apparatus of FIG. 7, the film is expanded in the longitudinal direction. By the apparatus of FIG. 8 which is a modification of the apparatus of FIG. 7, the film is expanded in both longitudinal and transverse directions. In the apparatus of FIG. 8, the both ends along the length of the article to be expanded are placed outside the heating zone and the part of the PTFE article in the heating zone is heated and sintered at a temperature higher than the melting point of the PTFE and expanded monoaxially between the ends to obtain a porous sintered material having micropores. The reason why the ends along the length are placed outside the heating zone is that during the expansion at a high temperature, the temperature of the end portions where the largest force may be applied is kept at a temperature lower than the melting point, preferably lower than the softening point of PTFE in order to prevent softening or melting of the end portions and to maintain the strength thereof so that the article is not broken during expansion.

The draw ratio of the film depends on the porosity, the pore size, the direction of expansion, the number of axis of expansion, etc. and is usually about 15 to 750%, preferably about 20 to 700% in view of the formation of the pores by the expansion of the unsintered PTFE article and the evenness of the pore size.

Preferably, the formation of the micropores during the monoaxial expansion of the PTFE article may be improved by keeping the distance between the ends in the unexpanded direction constant by placing the ends in the unexpanded direction as well as in the expanded direction outside the heating zone or by fixing the ends in the unexpanded direction with chucks or clips.

The porosity and the size of the pore vary with the draw ratio, the expansion direction, the number of axis of expansion, the sintering temperature, etc. Usually, the porosity is about 35 to 90%, and the size of the pore is about 0.01 to 50 microns.

The porous PTFE material may be rolled, expanded or heat-treated. By the heat-treatment, the expanded state of the porous material is set and the dimensional stability at a high temperature is greatly improved. If the distance between the ends in the unexpanded direction is not kept constant during the heat-treatment, the pores greatly decrease in number or disappear. In addition, by keeping the length in the unexpanded direction constant, the decrease or disappearance of the pores is effectively prevented. The distance between the ends can be kept constant by fixing the ends with chucks or clips or by using an unwind roll and a wind roll which revolve at the same peripheral speed.

The heat-treatment may be carried out at a temperature which the porous material will encounter in use. Practically, the heat-treatment is carried out by, after forming the porous material as described above, heating it without cooling or by reheating the cooled porous material at a later stage.

As described above, the specific PTFE fine powder having a large molecular weight and a comparatively large crystalline portion can be stretched at a temperature higher than the melting point of the unsintered PTFE article and further it is sintered and expanded simultaneously, which reduces the steps in the process for preparing the porous PTFE material. In addition, the porous PTFE material has improved mechanical properties and reserves its stability and functions for a long time.

Stretchability of the PTFE fine powder of the invention at a high temperature will be described further in detail by following Reference Examples in which parts and % are by weight unless otherwise indicated.

REFERENCE EXAMPLE 1

A homogeneous mixture of the PTFE fine powder obtained in Example 5 (100 part) and as a lubricant, liquid paraffin (30 parts) was prepressed under 20 Kg/cm$^2$ and then extruded in the form of a rod. The rod was rolled between a pair of metal-made rolls to form an elongate film having a thickness of 110 microns and width of 115 mm.

The elongate film was heated in trichlene for 20 minutes to remove the lubricant and wound on a tubular core.

The wound film was set on an unwind roll 41 in the stretching apparatus as shown in FIG. 1 and one end of the film was passed through the apparatus and set on a wind roll 42. A temperature of a heating zone 43 was kept at a temperature higher than the melting point of PTFE and rotation speed of a pair of pinch rolls 43 mounted at the entrance of the heating zone was kept faster than that of a pair of pinch rolls 45 mounted at the exit of the heating zone, thereby a part of the film was stretched sintered in the heating zone 43 to obtain a porous PTFE film. During stretching, air at 20° C. was blown on the pinch rolls 44 and 45 to prevent softening or melting of the parts of the film on the pinch rolls 44 and 45 between which the film was being stretched. In FIG. 1, numerals 48 and 49 designate guide rolls and numeral 50 designates a cooling roll.

In the same manner as above but changing the draw ratio and the temperature of the heating zone as shown in Table 6, several porous PTFE films were prepared.

The porosity, the size of the pore and the tensile strength of the porous film along the stretching direction were also shown in Table 6.

For comparison, a porous PTFE film (Sample No. 6) was prepared in the same manner as above but the temperature of the heating zone being 300° C. Its properties were shown in Table 6.

TABLE 6

| Sample No. | Temp. (°C.) | Draw ratio (%) | Porosity (%) | Pore size (micron) | Tensile*1 strength (Kg/cm²) | Thickness (microns) | Width (mm) | S.G. |
|---|---|---|---|---|---|---|---|---|
| 1 | 350 | 30 | 38 | 0.01–0.09 | 356 | 97 | 100 | 1.364 |
| 2 | 350 | 200 | 62 | 0.01–0.27 | 485 | 75 | 92 | 0.886 |
| 3 | 350 | 550 | 65 | 0.01–0.34 | 723 | 50 | 68 | 0.780 |
| 4 | 380 | 200 | 61 | 0.02–0.30 | 515 | 74 | 90 | 0.858 |
| 5 | 405 | 200 | 60 | 0.02–0.35 | 510 | 74 | 88 | 0.880 |
| 6 | 300 | 200 | 68 | 0.01–0.20 | 267 | 75 | 104 | 0.736 |

Note:
*1Measured at 25° C.

REFERENCE EXAMPLE 2

A porous PTFE film was prepared from the same unsintered PTFE film as used in Reference Example 1 with the apparatus of FIG. 8 by passing it through the pinch rolls 44 and the heating zone 43 kept at 350° C. the width of which gradually enlarged towards its exit while keeping the rotation speeds of the pinch rolls 44 and 45 substantially the same, the both ends of the film being chucked outside the heating zone 43 with chucks of a Tenter-type stretching machine 51 and stretching a part of the film in the heating zone in a draw ratio of 200% in the direction along the width to obtain a porous film having a thickness of 50 microns and a width of 345 mm (Sample No. 7).

In the same manner as above but further stretching the film in a draw ratio of 200% in the direction along the length between the pinch rolls 44 and 45 to obtain a biaxially expanded porous film (Sample No. 8). The properties of the porous films were shown in Table 7.

For comparison, two kinds of the PTFE porous films (Sample Nos. 9 and 10) were prepared in the same manner as in the case of Sample Nos. 7 and 8 respectively but the temperature of the heating zone being 300° C. The properties of these films are also shown in Table 7.

TABLE 7

| Sample No. | Temp. (°C.) | Draw ratio (%) | Porosity (%) | Pore size (micron) | Tensile strength*1 (Kg/cm²) Along length | Across length |
|---|---|---|---|---|---|---|
| 7 | 350 | 200 | 45 | 0.03–0.25 | 385 | 315 |
| 8 | 350 | 200 | 78 | 0.03–0.48 | 280 | 200 |
| 9 | 300 | 200 | 53 | 0.02–0.23 | 133 | 6 |

TABLE 7-continued

| Sample No. | Temp. (°C.) | Draw ratio (%) | Porosity (%) | Pore size (micron) | Tensile strength*1 (Kg/cm²) Along length | Across length |
|---|---|---|---|---|---|---|
| 10 | 300 | 200 | 82 | 0.02–0.26 | 165 | 7 |

Note:
*1Measured at 25° C.

COMPARATIVE REFERENCE EXAMPLE

In the same manner as in Reference Example 1, Sample No. 3, PTFE porous films were prepared form the PTFE fine powder used in Comparative Examples 1 to 6. The preparation conditions and the properties of the films are shown in Table 8, in which Sample Nos. 11 to 16 correspond to the PTFE fine powder used in Comparative Examples 1 to 6 respectively.

TABLE 8

| Sample No. | Draw ratio (%) | Porosity (%) | Pore size (micron) | Tensile*1 strength (Kg/cm²) | Thickness (microns) | Width (mm) |
|---|---|---|---|---|---|---|
| 11 | 130 | 53 | 0.03–1.30 | 280 | 80 | 90 |
| 12 | 150 | 50 | 0.03–1.30 | 324 | 73 | 86 |
| 13 | 170 | 43 | 0.03–1.30 | 365 | 68 | 75 |
| 14 | 550 | 72 | 0.04–1.40 | 340 | 56 | 77 |
| 15 | 550 | 66 | 0.04–1.20 | 376 | 48 | 76 |
| 16 | 550 | 56 | 0.03–1.00 | 483 | 48 | 69 |

Note:
*1Measured at 25° C.

REFERENCE EXAMPLE 3

In the same manner as in Reference Example 1 but the temperature of the heating zone being 360° C. and the expansion speed being 1.7%/sec., an unsintered PTFE film was sintered and stretched in the direction along the length. The expansion speed R is defined according to the following equation:

$$R = \frac{(V_2 - V_1) \times 100}{d}$$

wherein $V_1$ is a supplying speed of the film, $V_2$ is a winding speed of the film and d is the distance between the supplying point and the winding point (cf. Japanese Patent Publication No. 18991/1976).

Thereafter, the monoaxially stretched film was stretched in the direction across the length at 150° C. and the expansion speed of 2.2%/sec.

The properties of the thus obtained films were shown in Table 9.

TABLE 9

| Sample No. | PTFE fine powder | Draw ratio (%) Along length | Draw ratio (%) Across length | Porosity (%) | Average pore size (micron) | Thickness (microns) | Elongation at break across length (%) |
|---|---|---|---|---|---|---|---|
| 17 | Example 5 | 550 | 400 | 87 | 0.5 | 25 | 780 |
| 18 | Comparative Example 1 | 550 | 400 | 86 | 0.6 | 30 | 610 |
| 19 | Comparative Example 4 | 550 | 400 | 85 | 3.0 | 37 | 470 |
| 20 | Comparative Example 5 | 550 | 400 | 86 | 1.5 | 35 | 580 |
| 21 | Comparative Example 6 | 550 | 400 | 86 | 1.0 | 33 | 600 |

The fact that although the expansion speed was the same as in the case of the other films, the film No. 17 has a thinner film thickness than and the same porosity as the other films means that a wider film can be obtained from the PTFE film made from the PTFE fine powder of the invention, and the film has a larger expansion limit and better expansibility than others.

The porous PTFE film obtained in Reference Example 3 was partially adhered to a polyester (70 denier) knit fabric having expansion and contraction rate of 80% in both directions along and across the length and washed by a washing machine in water for 30 minutes. Washing was repeated till cracks were observed in the PTFE film. The test was repeated with three samples for one kind of the film. The number of washing cycle when the cracks were observed is shown in Table 10.

TABLE 10

| Sample No. | Number of washing cycle |
|---|---|
| 17 | >100 |
| 18 | 53–67 |
| 19 | 2–6 |
| 20 | 5–10 |
| 21 | 34–56 |

From the results shown in Table 10, it is understood that sample 17 hs far better durability than the others.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A polytetrafluoroethylene fine powder having an average molecular weight of at least 6,000,000, an amorphous index larger than 0.1 and a number average primary particle size of 0.1 to 0.8 micron and further having a first clear endothermic peak at a temperature of 347±3° C. and a second endothermic peak or shoulder at a temperature between 330° C. and the temperature of said first endothermic peak on a crystalline melting chart recorded by a differential scanning calorimeter.

2. PTFE fine powder according to claim 1, wherein said molecular weight is at least 6,000,000.

3. PTFE fine powder according to claim 1, wherein the amorphous index is larger than 0.11.

4. PTFE fine powder according to claim 1, wherein the endothermic ratio defined as the height of said first endothermic peak to the height of said second endothermic peak is larger than 0.30.

5. PTFE fine powder according to claim 1, wherein the critical thickness of devirification of the film formed from the fine powder is 20 to 45 microns.

6. The polytetrafluoroethylene fine powder according to claim 1 wherein said average molecular weight is at least 6,500,000.

7. A porous article made from a polytetrafluoroethylene fine powder as defined in claim 1.

8. An unsintered article comprising the polytetrafluoroethylene fine powder of claim 1.

* * * * *